(12) United States Patent
Cunningham et al.

(10) Patent No.: US 11,994,064 B2
(45) Date of Patent: May 28, 2024

(54) SYSTEMS AND METHODS FOR CONTROLLING AN INTAKE INLET SHAPE OF A PROPULSION SYSTEM AIR INTAKE

(71) Applicant: Pratt & Whitney Canada Corp., Longueuil (CA)

(72) Inventors: Mark Cunningham, Montreal (CA); Eray Akcayoz, Cote-Saint-Luc (CA); Raja Ramamurthy, Montreal (CA); Roberto Marrano, Boucherville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/977,722

(22) Filed: Oct. 31, 2022

(65) Prior Publication Data

US 2024/0141832 A1 May 2, 2024

(51) Int. Cl.
*F02C 7/042* (2006.01)
(52) U.S. Cl.
CPC ........ *F02C 7/042* (2013.01); *F05D 2220/323* (2013.01); *F05D 2270/60* (2013.01)
(58) Field of Classification Search
CPC ................................ F02C 7/042; F02K 1/085
See application file for complete search history.

(56) References Cited

U.S. PATENT DOCUMENTS

| 6,746,207 | B1 | 6/2004 | Mundt | |
|---|---|---|---|---|
| 10,738,699 | B2 | 8/2020 | Burnside | |
| 2005/0274103 | A1* | 12/2005 | Prasad | B64D 33/02 |
| | | | | 137/15.1 |
| 2009/0217643 | A1 | 9/2009 | Sokhey | |
| 2016/0053685 | A1* | 2/2016 | Labrecque | F02C 7/045 |
| | | | | 415/119 |
| 2018/0363554 | A1* | 12/2018 | Kroger | F02C 3/04 |
| 2019/0112978 | A1 | 4/2019 | Di Mare | |
| 2021/0348568 | A1* | 11/2021 | Loebig | F02C 9/18 |
| 2021/0355873 | A1 | 11/2021 | Christie | |

FOREIGN PATENT DOCUMENTS

| CN | 104863716 B | 1/2016 |
|---|---|---|
| FR | 3057616 B1 | 10/2019 |

OTHER PUBLICATIONS

EP Search Report for EP Patent Application No. 23207181.1 dated Mar. 4, 2024.

* cited by examiner

*Primary Examiner* — Katheryn A Malatek
(74) *Attorney, Agent, or Firm* — Getz Balich LLC

(57) ABSTRACT

An air intake for an aircraft propulsion system includes an air inlet duct and a flow control device. The air inlet duct includes an interior surface and an intake inlet. The interior surface extends from the intake inlet. The interior surface forms and surrounds an inlet flow passage through the air inlet duct. The intake inlet includes a top side, a bottom side, a first lateral side, and a second lateral side. Each of the first lateral side and the second lateral side extend between and to the top side and the bottom side. The flow control device is disposed inside the air inlet duct at the first lateral side. The flow control device is configured to form an asymmetrical shape of the intake inlet at the first lateral side relative to the second lateral side.

7 Claims, 5 Drawing Sheets

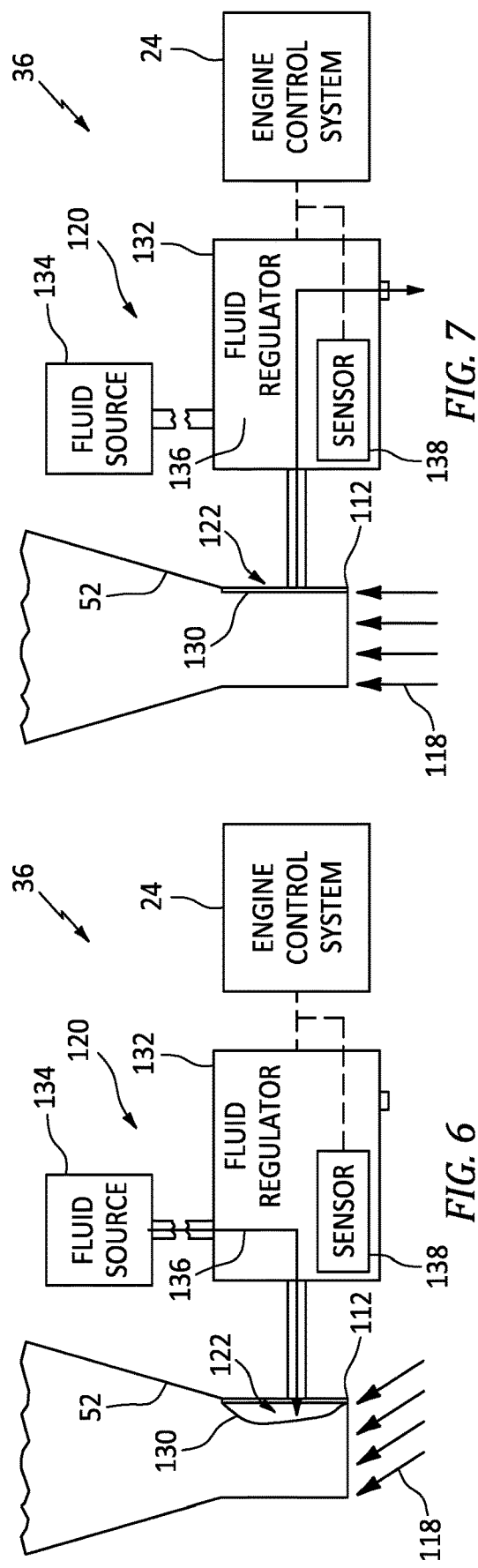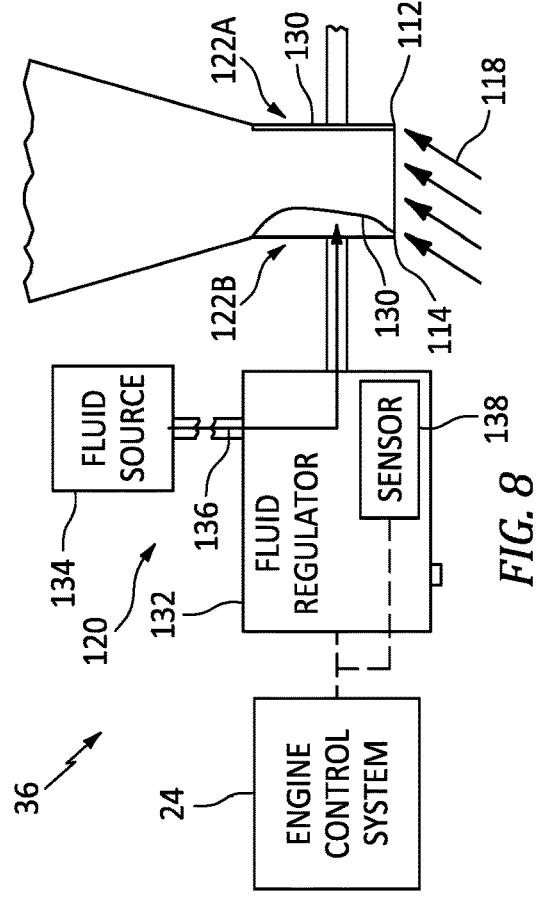

SYSTEMS AND METHODS FOR CONTROLLING AN INTAKE INLET SHAPE OF A PROPULSION SYSTEM AIR INTAKE

TECHNICAL FIELD

This disclosure relates generally to air intakes for aircraft propulsion systems and, more particularly, to systems and methods for controlling an intake inlet shape of an air intake.

BACKGROUND OF THE ART

Some propulsion systems for aircraft may include an air intake configured to direct ambient air for use by one or more assemblies (e.g., a gas turbine engine) of the propulsion system. Various systems and methods are known in the art for controlling intake air flow for an air intake. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an air intake for an aircraft propulsion system includes an air inlet duct and a flow control device. The air inlet duct includes an interior surface and an intake inlet. The interior surface extends from the intake inlet. The interior surface forms and surrounds an inlet flow passage through the air inlet duct. The intake inlet includes a top side, a bottom side, a first lateral side, and a second lateral side. Each of the first lateral side and the second lateral side extend between and to the top side and the bottom side. The flow control device is disposed inside the air inlet duct at the first lateral side. The flow control device is configured to form an asymmetrical shape of the intake inlet at the first lateral side relative to the second lateral side.

In any of the aspects or embodiments described above and herein, the flow control device may include a first device body mounted to the interior surface at the first lateral side. The first device body may have a fixed shape.

In any of the aspects or embodiments described above and herein, the flow control device may include a first device body mounted to the interior surface at the first lateral side. The first device body may have a deformable shape.

In any of the aspects or embodiments described above and herein, the flow control device may include a first inflatable boot forming the first device body. The first inflatable boot may be selectively positionable in a fully inflated position, a fully deflated position, and a plurality of intermediate inflation positions between the fully inflated position and the fully deflated position.

In any of the aspects or embodiments described above and herein, the flow control device may include a fluid regulator. The fluid regulator may be configured to be in fluid communication with a pressurized fluid source. The fluid regulator may be configured to direct a pressurized fluid from the pressurized fluid source to the first inflatable boot to selectively position the first inflatable boot.

In any of the aspects or embodiments described above and herein, the flow control device may include a second device body mounted to the interior surface at the second lateral side.

In any of the aspects or embodiments described above and herein, the flow control device may include a second inflatable boot forming the second device body.

In any of the aspects or embodiments described above and herein, the flow control device may include a fluid regulator. The fluid regulator may be configured to be in fluid communication with a pressurized fluid source. The fluid regulator may be configured to direct a pressurized fluid from the pressurized fluid source to the second inflatable boot to selectively position the second inflatable boot independent of a position of the first inflatable boot.

In any of the aspects or embodiments described above and herein, the first device body may include a leading edge, a trailing edge, and an air flow surface. The leading edge may be disposed at the second lateral side. The trailing edge may be disposed downstream of the leading edge. The air flow surface may extend from the leading edge to the trailing edge.

According to another aspect of the present disclosure, a method for controlling an intake inlet shape of an air intake for an aircraft propulsion system includes determining an air flow condition for the air intake. The air intake includes an air inlet duct including the intake inlet. The intake inlet including a top side, a bottom side, a first lateral side, and a second lateral side. Each of the first lateral side and the second lateral side extend between and to the top side and the bottom side. The method further includes controlling the intake inlet shape at the first lateral side by controlling a position of a flow control device based on the determined air flow condition.

In any of the aspects or embodiments described above and herein, controlling the intake inlet shape at the first lateral side may include selectively positioning an inflatable boot disposed at the first lateral side. The inflatable boot may be selectively positionable in a fully inflated position, a fully deflated position, and a plurality of intermediate inflation positions between the fully inflated position and the fully deflated position.

In any of the aspects or embodiments described above and herein, selectively positioning the inflatable boot may include directing a pressurized fluid to the inflatable boot to inflate the inflatable boot.

In any of the aspects or embodiments described above and herein, determining the air flow condition may include determining an air flow direction of ambient air entering the intake inlet.

In any of the aspects or embodiments described above and herein, determining the air flow direction may include determining a rotation speed of a propeller of the aircraft propulsion system.

According to another aspect of the present disclosure, a propulsion system for an aircraft includes a gas turbine engine and an air intake. The gas turbine engine includes a propeller. The propeller is configured for rotation about a rotational axis of the aircraft propulsion system. The gas turbine engine forms a core flow path. The air intake is configured to direct air into the core flow path. The air intake includes an air inlet duct and a flow control device. The air inlet duct includes an intake inlet disposed downstream of the propeller. The intake inlet includes a top side, a bottom side, a first lateral side, and a second lateral side. Each of the first lateral side and the second lateral side extend between and to the top side and the bottom side. The flow control device is disposed inside the air inlet duct at the first lateral side. The flow control device is configured to form an asymmetrical shape of the intake inlet at the first lateral side relative to the second lateral side.

In any of the aspects or embodiments described above and herein, the flow control device may include an inflatable boot and a fluid regulator. The inflatable boot may be disposed at the first lateral side. The fluid regulator may be in fluid communication with the inflatable boot. The fluid regulator may be configured to selectively position the inflatable boot in a fully inflated position, a fully deflated position, and a plurality of intermediate inflation positions between the fully inflated position and the fully deflated position to control a shape of the intake inlet.

In any of the aspects or embodiments described above and herein, the gas turbine engine may include a compressor forming the core flow path. The fluid regulator may be in fluid communication with the compressor. The fluid regulator may be configured to receive a pressurized fluid from the compressor and direct the pressurized fluid to the inflatable boot.

In any of the aspects or embodiments described above and herein, the propulsion system may further include an engine control system. The engine control system may be in signal communication with the fluid regulator. The engine control system may include a processor in communication with a non-transitory memory storing instructions, which instructions when executed by the processor, may cause the processor to: determine an air flow condition for the air intake and control the fluid regulator to selectively position the inflatable boot to control the shape of the intake inlet based on the determined air flow condition.

In any of the aspects or embodiments described above and herein, the instructions, when executed by the processor, may further cause the processor to determine the air flow condition based on a rotation speed of the propeller and a rotation direction of the propeller.

In any of the aspects or embodiments described above and herein, the intake inlet may be radially offset from the rotational axis in a radial direction.

The present disclosure, and all its aspects, embodiments and advantages associated therewith will become more readily apparent in view of the detailed description provided below, including the accompanying drawings.

DESCRIPTION OF THE DRAWINGS

FIG. 6 illustrates another top, cutaway view of the portion of the air intake of FIG. 4 including a flow control device, in accordance with one or more embodiments of the present disclosure.

FIG. 7 illustrates another top, cutaway view of the portion of the air intake of FIG. 4 including a flow control device, in accordance with one or more embodiments of the present disclosure.

FIG. 8 illustrates another top, cutaway view of the portion of the air intake of FIG. 4 including a flow control device, in accordance with one or more embodiments of the present disclosure.

DETAILED DESCRIPTION

Figure 1:
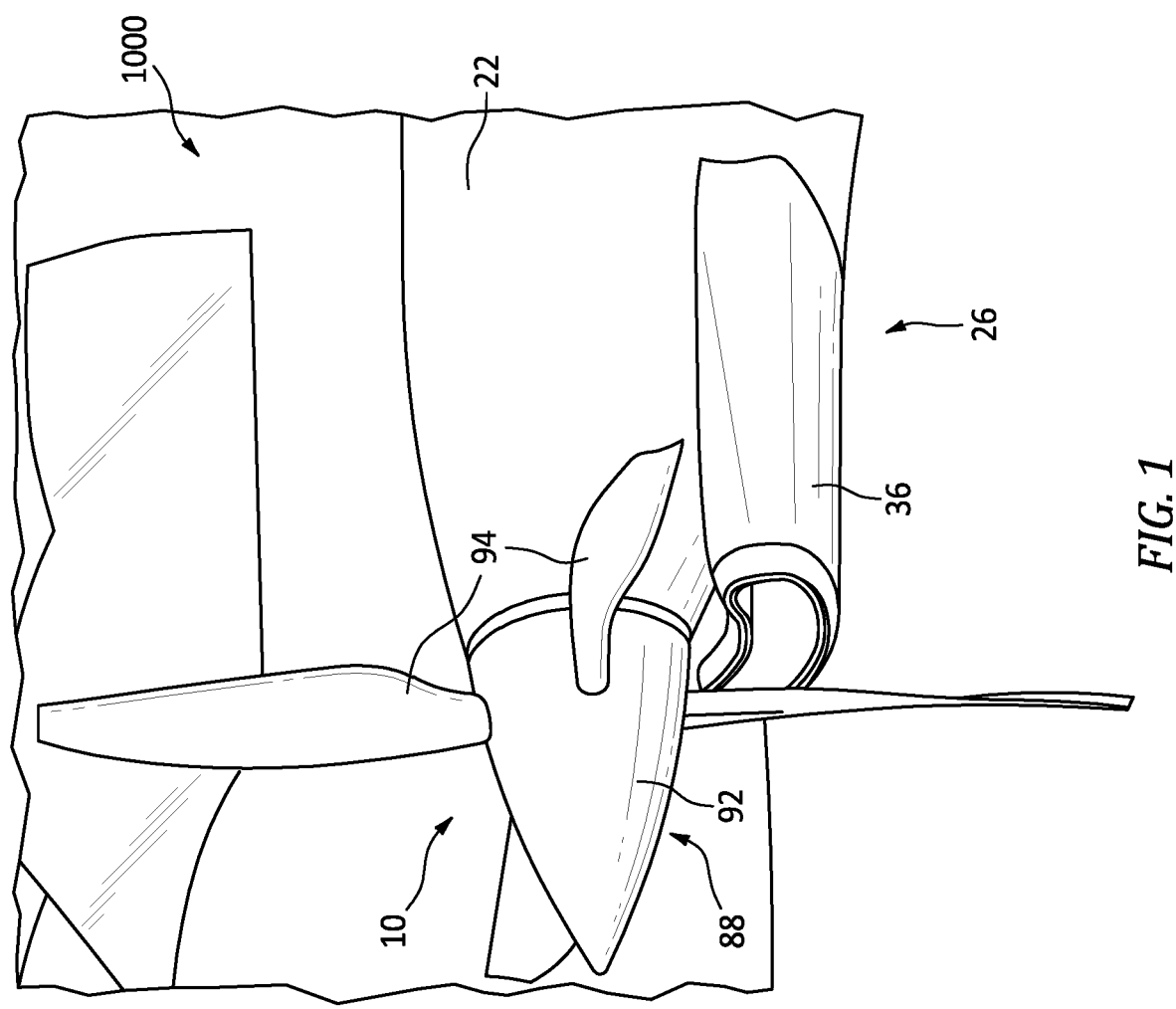
FIG. 1 illustrates a perspective view of a propulsion system for an aircraft, in accordance with one or more embodiments of the present disclosure.
Figure 2:
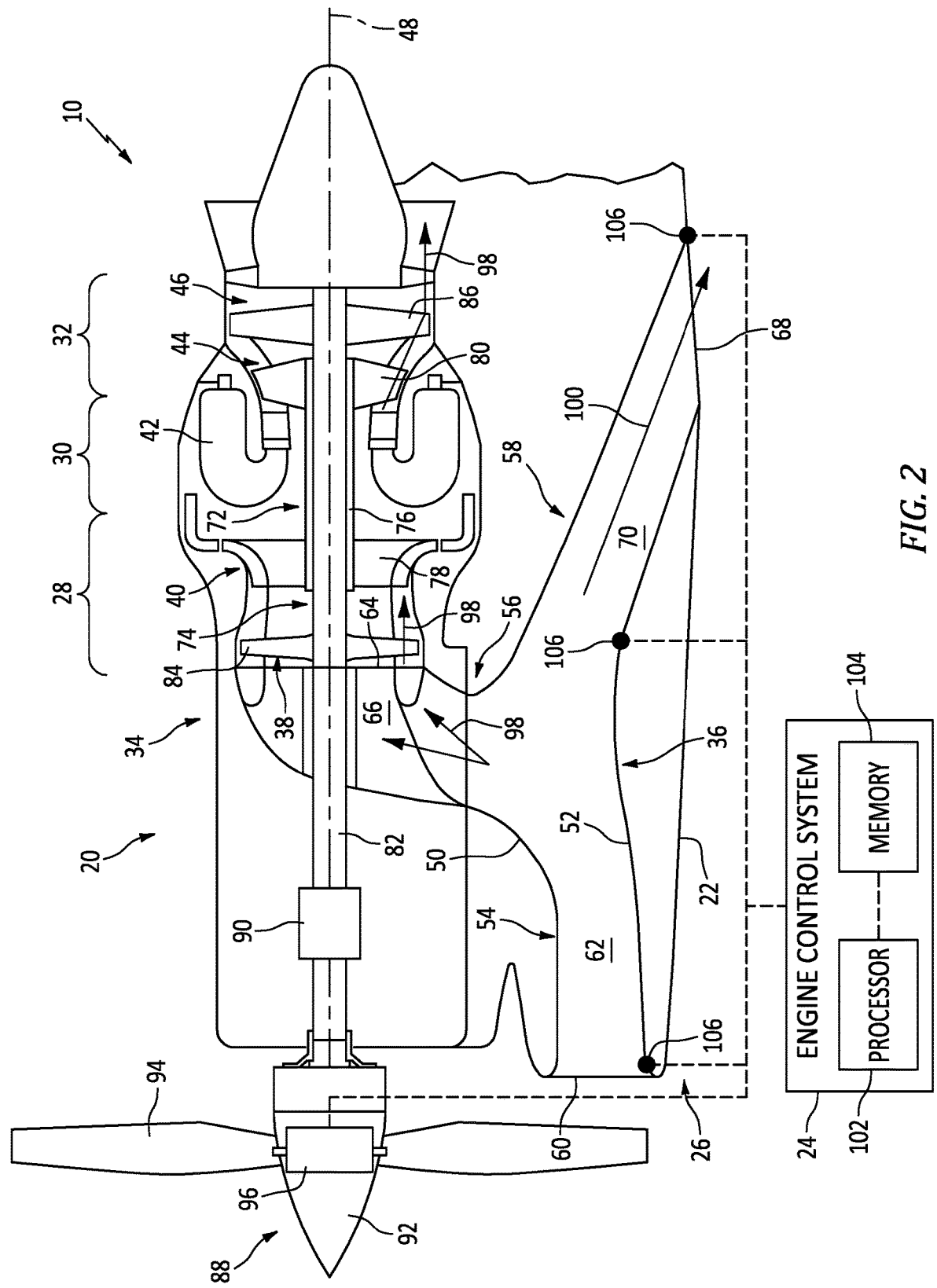
FIG. 2 illustrates a schematic view of the propulsion system of FIG. 1, in accordance with one or more embodiments of the present disclosure.

FIGS. 1 and 2 illustrate a propulsion system 10 for an aircraft 1000. The aircraft propulsion system 10 includes a gas turbine engine 20, a nacelle 22 (e.g., an aircraft propulsion system housing), and an engine control system 24. The propulsion system 10 (e.g., the nacelle 22) may be mounted to or otherwise formed by a portion of the aircraft 1000 such as, but not limited to, a wing or fuselage of the aircraft 1000.

The gas turbine engine 20 of FIGS. 1 and 2 is configured as a turboprop engine. However, the present disclosure is not limited to any particular configuration of gas turbine engine for the propulsion assembly 10, and examples of gas turbine engine configurations for the propulsion system 10 may include, but are not limited to, a turbofan engine, a turbojet engine, a propfan engine, or the like. The gas turbine engine 20 of FIGS. 1 and 2, for example, includes an air inlet section 26, a compressor section 28, a combustor section 30, a turbine section 32, and an engine static structure 34. The air inlet section includes an air intake 36. The compressor section 28 may include a low-pressure compressor (LPC) 38 and a high-pressure compressor (HPC) 40. The combustor section 28 includes an annular combustor 42. The turbine section 32 may include a high-pressure turbine (HPT) 44 and a low-pressure turbine (LPT) 46.

The gas turbine engine 20 sections 28, 30, and 32 of FIG. 2 are arranged sequentially along an axial centerline 48 (e.g., a rotational axis) of the propulsion system 10. The engine static structure 34 may include, for example, one or more engine cases for the gas turbine engine 20. The engine static structure 34 may additionally include cowlings, bearing assemblies, or other structural components of the gas turbine engine 20. The one or more engine cases house and/or structurally support one or more of the engine sections 26, 28, 30, and 32. The engine sections 28, 30, and 32 may be collectively referred to as an "engine core" of the gas turbine engine 20.

The air intake 36 is configured to direct a flow of ambient air into the engine core of the gas turbine engine 20. The air intake 36 of FIGS. 1 and 2 includes an intake body 50. The intake body 50 includes an interior surface 52 forming a series of air passages through the air intake 36. The intake body 50 forms an air inlet duct 54, a core flow duct 56, and a bypass flow duct 58. Each of the air inlet duct 54, the core flow duct 56, and the bypass flow duct 58 include portions of the interior surface 52. For clarity, the air intake 36 of FIG. 2 may be understood to have an exaggerated size relative to other components of the propulsion system 10. The present disclosure, however, is not limited to any particular size of the air intake 36.

The air inlet duct 54 includes an intake inlet 60 of the air intake 36. The intake inlet 60 forms an opening at (e.g., on, adjacent, or proximate) an upstream end of the air intake 36. The air inlet duct 54 may be disposed outside of the gas turbine engine 20 and may be formed by, disposed within, or otherwise in contact with the nacelle 22. The intake inlet 60 of FIGS. 1 and 2 radially offset from the axial centerline 48. For example, the intake inlet 60 (e.g., the entire intake inlet 60) may be radially offset from the axial centerline 48 in a radial direction (e.g., downwardly), as shown in FIGS. 1 and 2. The intake inlet 60 may also be configured with an axial facing orientation. For example, the intake inlet 60 of FIGS. 1 and 2 faces in an axially-forward direction. The present disclosure, however, is not limited to the particular configuration and orientation of the intake inlet of FIGS. 1 and 2. The interior surface 52 of the air inlet duct 54 surrounds and forms an inlet flow passage 62 through the air inlet duct 54. The inlet flow passage 62 extends from the intake inlet 60 to the core flow duct 56 and the bypass flow duct 58.

The core flow duct 56 includes a core outlet 64 of the air intake 36. The core outlet 64 forms an opening at (e.g., on, adjacent, or proximate) a downstream end of the air intake 36. The core outlet 64 is disposed at (e.g., on, adjacent, or proximate) the compressor section 28 to direct ambient air entering the air intake 36 into the compressor section 28. For example, the core outlet 64 of FIG. 2 is disposed at (e.g., on, adjacent, or proximate) and in fluid communication with an inlet of the low-pressure compressor 38. The interior surface 52 of the core flow duct 56 surrounds and forms a core flow passage 66 through the core flow duct 56. The core flow passage 66 extends from the air inlet duct 54 to the core outlet 64. The core flow duct 56 of FIG. 2 extends in a radially inward direction from the air inlet duct 54 to the core outlet 64. The core outlet 64 and portions of the core flow duct 56 may be configured to form an annular portion of the core flow passage 66 extending circumferentially about (e.g., completely around) the axial centerline 48, as shown in FIG. 2. For example, the core flow duct 56 may form an annular fluid scroll portion including a plurality of struts configured to direct and/or apply a swirl component to the core air flowing through the core flow duct 56.

The bypass flow duct 58 includes a bypass outlet 68 of the air intake 36. The bypass outlet 68 forms an opening at (e.g., on, adjacent, or proximate) a downstream end of the air intake 36. The bypass duct 58 may be disposed outside of the gas turbine engine 20 and may be formed by, disposed within, or otherwise in contact with the nacelle 22. For example, the bypass outlet 68 may be disposed at (e.g., on, adjacent, or proximate) or otherwise formed through an exterior surface of the nacelle 22 to direct air from the air intake 36 to an exterior of the propulsion system 10. The interior surface 52 of the bypass flow duct 58 surrounds and forms a bypass flow passage 70 through the bypass flow duct 58. The bypass flow passage 70 extends from the air inlet duct 54 to the bypass outlet 68. The bypass flow duct 58 of FIG. 2 extends in an axially aft and a radially outward direction from the air inlet duct 54 to the bypass outlet 68. It should be understood that the present disclosure is not limited to the bypass flow duct 58 configuration of FIG. 2. Aspects of the present disclosure may be applicable to air intakes having different bypass flow duct configurations as well as to air intakes which do not include a bypass flow duct.

The gas turbine engine 20 of FIG. 2 further includes a first rotational assembly 72 (e.g., a high-pressure spool) and a second rotational assembly 74 (e.g., a low-pressure spool). The first rotational assembly 72 and the second rotational assembly 74 are mounted for rotation about the axial centerline 48 relative to the engine static structure 34.

The first rotational assembly 72 includes a first shaft 76, a bladed first compressor rotor 78 for the high-pressure compressor 40, and a bladed first turbine rotor 80 for the high-pressure turbine 44. The first shaft 76 interconnects the bladed first compressor rotor 78 and the bladed first turbine rotor 80. The second rotational assembly 74 includes a second shaft 82, a bladed second compressor rotor 84 for the low-pressure compressor 38, a bladed second turbine rotor 86 for the low-pressure turbine 46, and a propeller 88. The second shaft 82 interconnects the bladed second compressor rotor 84 and the bladed second turbine rotor 86. The second shaft 82 may be connected to the propeller 88 by one or more speed-reducing gear assemblies 90 to drive the propeller 88 at a reduced rotational speed relative to the second shaft 82. Alternatively, the second shaft 82 may directly interconnect the propeller 88 with the bladed second compressor rotor 84 and the bladed second turbine rotor 86. The combustor 42 of FIG. 2 is disposed between the bladed first compressor rotor 78 and the bladed first turbine rotor 80 along the axial centerline 48.

The propeller 88 of FIGS. 1 and 2 includes a hub 92 and a plurality of propeller blades 94. The propeller blades 94 are mounted to the hub 92. The propeller blades 94 of FIGS. 1 and 2 are circumferentially distributed about the hub 92 relative to the axial centerline 48. However, it should be understood that the propeller 88 may be configured for rotation about a rotational axis which is different than the axial centerline 48 and, therefore, the propeller blades 94 may be circumferentially distributed about this different rotational axis. The propeller blades 94 extend radially outward from the hub 92. As shown in FIGS. 1 and 2, the propeller blades 94 may extend radially outward from the hub 92 such that the propeller blades 94 radially overlap all or a portion of the intake inlet 60. The propeller blades 94 may be additionally or alternatively be disposed axially forward of the intake inlet 60. In some embodiments, each of the propeller blades 94 may be configured to rotate about a lengthwise axis of the propeller blade 94 to vary a pitch of the propeller blade 94. For example, as shown in FIG. 2, the propulsion assembly 10 or its propeller 88 may include an actuation system 96 configured to effect rotation of the propeller blades 94. The actuation system 96 may be configured as a mechanical actuation system, an electro-mechanical actuation system, a hydraulic actuation system, a pneumatic actuation system, or another other suitable configuration for effecting rotation of the propeller blades 94.

The nacelle 22 houses the gas turbine engine 20 and forms and aerodynamic cover for the propulsion system 10. The nacelle 22 may extend circumferentially about (e.g., completely around) the axial centerline 48. The nacelle 22 may surround and/or support portions of the air intake 36.

During operation of the propulsion system 10 of FIGS. 1 and 2, ambient air enters the propulsion system 10 through the air intake 36 and is directed into a core flow path 98 through core flow passage 66 and a bypass flow path 100 through the bypass flow passage 70. The core flow path 98 extends axially from the core outlet 64 along the axial centerline 48 within the gas turbine engine 20. More particularly, the core flow path 98 extends axially through the gas turbine engine 20 sections 28, 30, 32 of FIG. 2. The air within the core flow path 98 may be referred to as "core air." The core air is compressed by the bladed second compressor rotor 84 and the bladed first compressor rotor 78 and directed into a combustion chamber of the combustor 42. Fuel is injected into the combustion chamber and mixed with the compressed core air to provide a fuel-air mixture. This fuel-air mixture is ignited and combustion products thereof, which may be referred to as "core combustion gas," flow through and sequentially cause the bladed first turbine rotor 80 and the bladed second turbine rotor 86 to rotate. The rotation of the bladed first turbine rotor 80 and the bladed second turbine rotor 86 respectively drive rotation of the first rotational assembly 72 and the second rotational assembly 74. Rotation of the second rotational assembly 74 further drives rotation of the propeller 88 to provide propulsion (e.g., thrust) for the aircraft 1000. Rotation of the propeller 88 in proximity to the intake inlet 60 may induce a circumferential and/or swirl component to a flow direction of the ambient air entering the intake inlet 60, which influence may be referred to as "propeller wash" or "prop wash." The bypass flow path 100 extends through the bypass flow passage 70 from the air inlet duct 54 to the bypass outlet 68. The air within the bypass flow path 100 may be referred to as "bypass air."

The engine control system 24 of FIG. 2 includes a processor 102 and memory 104. The memory 104 is in signal communication with the processor 102. The processor 102 may include any type of computing device, computational circuit, or any type of process or processing circuit capable of executing a series of instructions that are stored in the memory 104, thereby causing the processor 102 to perform or control one or more steps or other processes. The processor 102 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 104 may represent one or more algorithms for controlling aspects of the propulsion system 10, and the stored instructions are not limited to any particular form (e.g., program files, system data, buffers, drivers, utilities, system programs, etc.) provided they can be executed by the processor 102. The memory 104 may be a non-transitory computer readable storage medium configured to store instructions that when executed by one or more processors, cause the one or more processors to perform or cause the performance of certain functions. The memory 104 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the engine control system 24 may be achieved via the use of hardware, software, firmware, or any combination thereof. The engine control system 24 may also include input and output devices (e.g., keyboards, buttons, switches, touch screens, video monitors, sensor readouts, data ports, etc.) that enable the operator to input instructions, receive data, etc. The engine control system 24 may be located within the propulsion system 10 or may be located on the aircraft 1000 (see FIG. 1) on which the propulsion system 10 is installed.

The engine control system 24 may form or otherwise be part of an electronic engine controller (EEC) for the propulsion system 10. The EEC may control operating parameters of the gas turbine engine 20 including, but not limited to, fuel flow, stator vane position (e.g., variable compressor inlet guide vane (IGV) position), compressor air bleed valve position, propeller blade 94 pitch, etc. so as to control an engine power and/or thrust of the gas turbine engine 20. In some embodiments, the EEC may be part of a full authority digital engine control (FADEC) system for the propulsion system 10.

The engine control system 24 may be configured to receive data associated with operation of the gas turbine engine 20. The data may include operational parameters (e.g., pressure, temperature, fuel flow, rotation speed, shaft torque, etc.) for the gas turbine engine 20. The engine control system 24 may be configured to measure or otherwise obtain operational parameters for the propeller 88 such as, but not limited to, propeller 88 rotation speed and/or pitch positions of the propeller blades 94. For example, the engine control system 24 may be in communication (e.g., signal communication) with the actuation system 96 to receive one or more operational parameters for the propeller 88. The engine control system 24 may include and be in communication (e.g., signal communication) with one or more sensors 106 distributed throughout the gas turbine engine 20. The sensors 106 may include, but are not limited to, one or more of the following exemplary sensors: an air intake pressure sensor, an air intake flow sensor, an air intake temperature sensor, and the like. The sensors 106 may be disposed at one or more locations at (e.g., on, adjacent, or proximate) or within the air intake 36. Additional or alternative sensors 106 (e.g., air pressure sensors, air temperature sensors, etc.) may be disposed at other locations of the aircraft 1000 or its propulsion system 10. The sensors 106 may be used, for example, to determine or otherwise identify operational conditions of the air intake 36 such as icing conditions, air flow conditions, and the like.

Figure 3:
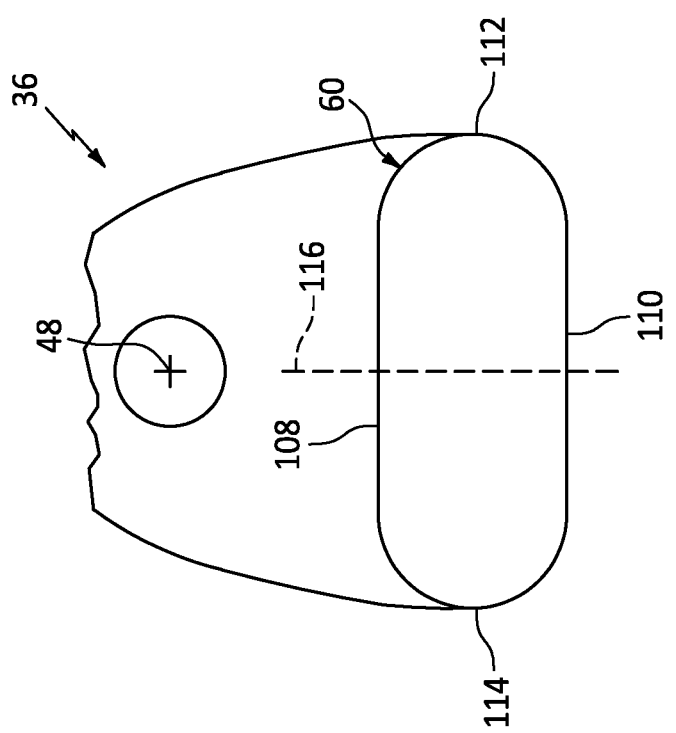
FIG. 3 illustrates a front view of an air intake, in accordance with one or more embodiments of the present disclosure.

FIG. 3 illustrates a front view of the air intake 36 showing the intake inlet 60. The intake inlet 60 includes a top side 108, a bottom side, 110, a first lateral side 112, and a second lateral side 114. The bottom side 110 is disposed opposite the intake inlet 60 from the top side 108. For the intake inlet 60 of FIG. 3, the bottom side 110 may be understood to be radially outward of the top side 108 relative to the axial centerline 48. The present disclosure, however, is not limited to any particular orientation of the intake inlet 60 relative to the axial centerline 48 and the terms "top" and "bottom," as used herein, should not be understood to be otherwise limiting. Each of the top side 108 and the bottom side 110 may have a substantially straight orientation as shown, for example, in FIG. 3. However, in some embodiments, the top side 108 and/or the bottom side 110 may alternatively have a curved orientation (see, e.g., the air intake 36 of FIG. 1). The first lateral side 112 is disposed opposite the intake inlet 60 from the second lateral side 114. Each of the first lateral side 112 and the second lateral side 114 extend between and to the top side 108 and the bottom side 110. Each of the first lateral side 112 and the second lateral side 114 of FIG. 3 have a curved configuration (e.g., a semi-circular configuration) forming a concave portion of the intake inlet 60. The present disclosure, however, is not limited to any particular shape for the intake inlet 60 and its sides 108, 110, 112, 114. While the intake inlet 60 of FIG. 3 is illustrated as being elongated in a lateral direction (e.g., from the first lateral side 112 to the second lateral side 114), the present disclosure is not limited to this particular shape of the intake inlet 60, and other intake inlet shapes (e.g., circle, square, rectangle, etc.) may be contemplated in accordance with the present disclosure.

The intake inlet 60 of FIG. 3 has a symmetrical configuration, which symmetrical configuration may be defined, for example, with respect to a center plane 116 of the air intake 36. The center plane 116 may be a radial plane extending along the axial centerline 48, which radial plane equal divides the intake inlet 60 (e.g., in a first lateral half and a second lateral half). The present disclosure, however, is not limited to intake inlets, such as the intake inlet 60, having a symmetrical configuration as described above.

Figure 4:
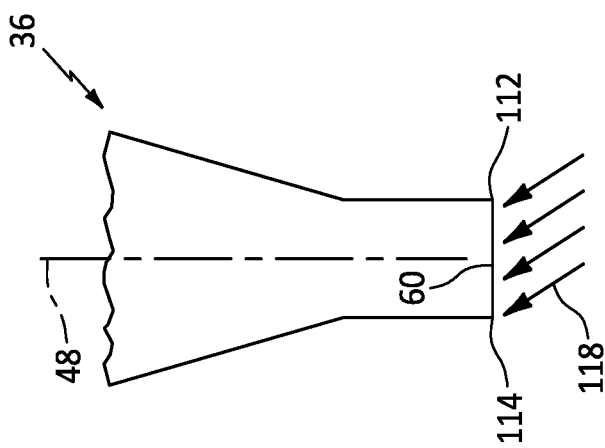
FIG. 4 illustrates a top, cutaway view of a portion of an air intake, in accordance with one or more embodiments of the present disclosure.

FIG. 4 illustrates a top, cutaway view of a portion of the air intake 36 including the intake inlet 60. As previously discussed, rotation of the propeller 88 (see FIGS. 1 and 2) to provide propulsion for the aircraft 1000 (see FIG. 1) may induce a circumferential and/or swirl component to a flow direction of the ambient air entering the intake inlet 60. For example, FIG. 3 illustrates an exemplary direction of an ambient air flow 118 of entering the intake inlet 60 in a non-axial direction (e.g., a direction parallel to the axial centerline 48). The non-axial direction of the air flow 118 may contribute to flow separation of the air within the air intake 36 at (e.g., on, adjacent, or proximate) a lateral side (e.g., the first lateral side 112 or the second lateral side 114) of the intake inlet 60, thereby contributing to pressure loss and flow distortion within the air intake 36 (e.g., reduced air intake efficiency). For example, the non-axial direction of the air flow 118 of FIG. 3 may contribute to flow separation of the air at (e.g., on, adjacent, or proximate) the first lateral side 112. The air flow 118 is illustrated in FIG. 3 as generally flowing in the non-axial direction from right to left, however, it should be understood that air flow 118 may flow in an opposite non-axial direction (e.g., from left to right, top to bottom, bottom to top, etc.), for example, based on a rotation direction of the propeller 88. The non-axial direction of the air flow 118 may be a function of numerous factors such as, but not limited to, air speed of the aircraft 1000, aircraft 1000 angle of attack, wind speed and direction, propeller 88 rotation speed and direction, propeller blade 94 pitch, and/or propeller blade 94 shape and size.

Figure 5:
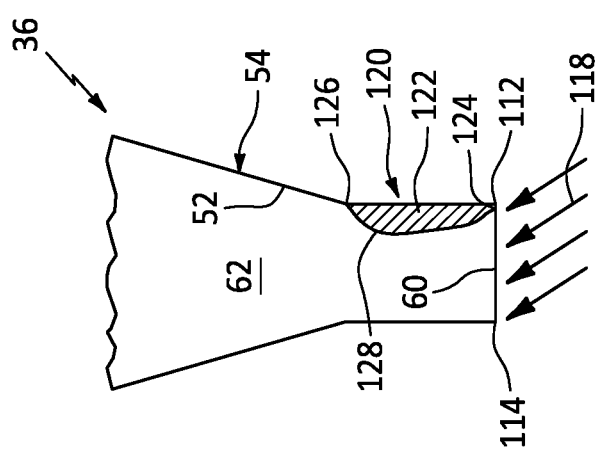
FIG. 5 illustrates a top, cutaway view of the portion of the air intake of FIG. 4 including a flow control device, in accordance with one or more embodiments of the present disclosure.

Referring to FIG. 5, the air intake 36 includes a flow control device 120. The flow control device 120 is disposed within the air inlet duct 54 at (e.g., on, adjacent, or proximate) one or both of the first lateral side 112 and the second lateral side 114. The flow control device 120 of FIG. 5 is disposed at (e.g., on, adjacent, or proximate) the first lateral side 112. The flow control device 120 include a device body 122 mounted to or otherwise positioned on the interior surface 52. Alternatively, the device body 122 may be formed by a portion of the intake body 50. The flow control device 120 may project outward from the interior surface 52 at (e.g., on, adjacent, or proximate) the first lateral side 112 toward the second lateral side 114, as shown in FIG. 5, to form an asymmetrical shape of the intake inlet 60 and the inlet flow passage 62 at (e.g., on, adjacent, or proximate) the intake inlet 60. The flow control device 120 and the resultant asymmetrical shape of the inlet flow passage 62 may facilitate straightening of the air flow within the inlet flow passage 62 and managing pressure gradients of the air flow, thereby minimizing flow separation of the air flow along the respective lateral side 112, 114 (e.g., the first lateral side 112 of FIG. 5).

The device body 122 of FIG. 5 includes a leading edge 124, a trailing edge 126, and an air flow surface 128. The leading edge 124 may be an upstream-most portion of the device body 122, with respect to air flow through the air intake 36. The leading edge 124 may be disposed at (e.g., on, adjacent, or proximate) the intake inlet 60 as shown, for example, in FIG. 5. The trailing edge 126 is disposed downstream of the leading edge 124. The trailing edge 126 may be a downstream-most portion of the device body 122. Each of the leading edge 124 and the trailing edge 126 may be disposed at (e.g., on, adjacent, or proximate) the interior surface 52. The air flow surface 128 may extend from the leading edge 124 to the trailing edge 126. The air flow surface 128 may form a convex or substantially convex shape of the device body 122 from the leading edge 124 to the trailing edge 126. The device body 122 may have a fixed shape formed by or otherwise include, for example, a metal material, a rigid polymeric material (e.g., thermoplastic), or any other suitably rigid material. As will be discussed in further detail, the device body 122 may alternatively have a deformable or selectively deformable shape.

Referring to FIGS. 6 and 7, the flow control device 120 may include an inflatable boot 130. The flow control device 120 may additionally include a fluid regulator 132. The inflatable boot 130 may form all or a portion of the device body 122. For example, the inflatable boot 130 of FIGS. 6 and 7 is mounted to or otherwise positioned on the interior surface 52 at the first lateral side 112. The inflatable boot 130 may be formed by or may otherwise include a flexible material such as, but not limited to, rubber and/or another suitable elastomeric material.

The fluid regulator 132 is in fluid communication (e.g., using one or more suitable conduits) with the inflatable boot 130. The fluid regulator 132 is configured to direct a fluid into the inflatable boot 130 to increase a size of (e.g., inflate) the inflatable boot 130. Similarly, the fluid regulator 132 is configured to direct a fluid out of the inflatable boot 130 to decrease a size of (e.g., deflate) the inflatable boot 130. The fluid regulator 132 may include one or more components such as, but not limited to, flow control valves (e.g., spring-loaded control valves), pressure-relief valves, fluid vents, and the like so as to direct and control a supply of fluid to or from the inflatable boot 130. The present disclosure, however, is not limited to any particular configuration of the fluid regulator 132. FIG. 6 illustrates the inflatable boot 130 in an inflated position. FIG. 7 illustrates the inflatable boot 130 in a deflated position. The fluid regulator 132 is in fluid communication (e.g., using one or more suitable conduits) with a pressurized fluid source 134. The fluid regulator 132 is configured to receive a pressurized fluid 136 from the pressurized fluid source 134. The pressurized fluid source 134 may include, for example, one of the low-pressure compressor 38 or the high-pressure compressor 40 (see FIG. 2). For example, the low-pressure compressor 38 or the high-pressure compressor 40 may be configured to supply pressurized bleed air (e.g., from an intermediate stage or compressor outlet) to the fluid regulator 132. The fluid regulator 132 may include a pressure sensor 138 configured to measure a pressure of the fluid in or supplied to the inflatable boot 130. The fluid regulator 132 and/or its pressure sensor 138 may be in communication (e.g., signal communication) with the engine control system 24. The inflatable boot 130 may be selectively positionable by the fluid regulator 132 in a fully inflated position, a fully deflated position, and a plurality of inflated positions between the fully inflated position and the fully deflated position.

FIG. 8 illustrates the air intake 36 including the flow control device 120. The flow control device 120 of FIG. 8 includes a first device body 122A and a second device body 122B. The first device body 122A is disposed at (e.g., on, adjacent or proximate) the first lateral side 112. The second device body 122B is disposed at (e.g., on, adjacent or proximate) the second lateral side 114. Each of the first device body 122A and the second device body 122B may be formed by a discrete inflatable boot 130. The fluid regulator 132 may be in fluid communication with the inflatable boot 130 of each of the first device body 122A and the second device body 122B. The fluid regulator 132 may be configured to inflate and deflate the inflatable boot 130 of each of the first device body 122A and the second device body 122B independent of each other of the first device body 122A and the second device body 122B. For example, the inflatable boot 130 of the second device body 122B of FIG. 8 is in an inflated position while the inflatable boot 130 of the first device body 122A of FIG. 8 is in a deflated position. Accordingly, the flow control device 120 may be configured to inflate or deflate the inflatable boot 130 of each of the first device body 122A and the second device body 122B to facilitate straightening of air flow for different non-axial air flow 118 directions (e.g., a clockwise direction and a counter-clockwise direction).

Figure 9:
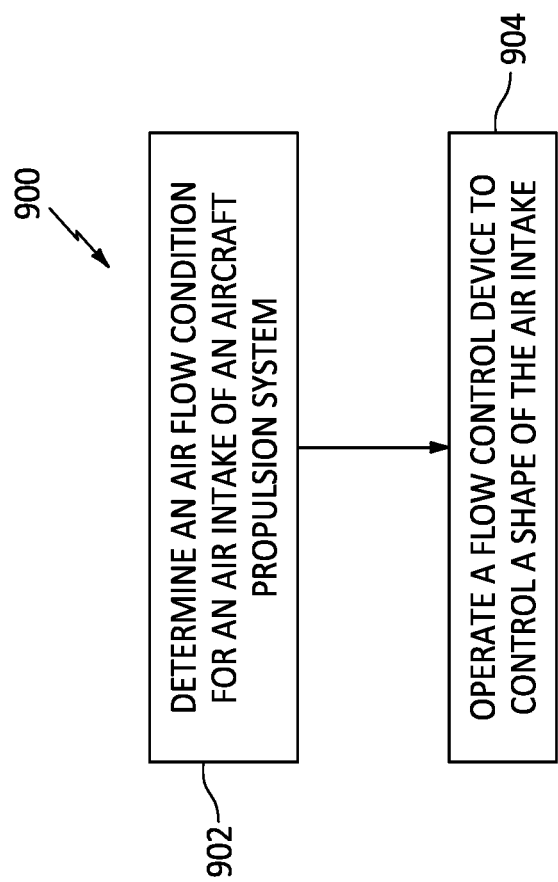
FIG. 9 illustrates a block diagram of a method for controlling an intake inlet shape of an air intake of an aircraft propulsion system, in accordance with one or more embodiments of the present disclosure.

Referring to FIGS. 6-9, a Method 900 for controlling an intake inlet shape of an air intake of an aircraft propulsion system is provided. FIG. 9 illustrates a flowchart for the Method 900. The Method 900 may be performed for the propulsion system 10 and its air intake 36, as described herein. The engine control system 24 may be used to execute or control one or more steps of the Method 900. For example, the processor 102 may execute instructions stored in memory 104, thereby causing the engine control system 24 and/or its processor 102 to execute or otherwise control one or more steps of the Method 900. However, while the Method 900 may be described herein with respect to the propulsion system 10, the air intake 36, and the engine control system 24, the present disclosure Method 900 is not limited to use with the propulsion system 10, the air intake 36, and the engine control system 24 described herein. Unless otherwise noted herein, it should be understood that the steps of Method 900 are not required to be performed in the specific sequence in which they are discussed below and, in some embodiments, the steps of Method 900 may be performed separately or simultaneously.

In Step 902, an air flow condition for the air intake 36 is determined or otherwise obtained by the engine control system 24. For example, the engine control system 24 may determine that the ambient air flow 118 entering the intake inlet 60 has a non-axial flow direction. The engine control system 24 may further determine a magnitude of the non-axial flow direction (e.g., an approximate angle of the flow direction relative to the axial direction). The air flow condition for the air intake 36 may be determined using, for example, sensor data from the sensors 106 and/or other sensor data and operational parameters of the aircraft 1000 (see FIG. 1) or its propulsion system 10. For example, the engine control system 24 may determine an air flow condition for the air intake 36 based on one or more of wind speed and direction, propeller 88 rotation speed and direction, propeller blade 94 pitch, air intake 36 pressure, air intake 36 temperature, air intake 36 flow rate, altitude, and operational power of the gas turbine engine 20 (e.g., based on shaft rotation speed, indicated turbine temperature (ITT), fuel flow rate, etc.).

In Step 904, the flow control device 120 may be operated to control a shape of the intake inlet 60 (e.g., an asymmetrical shape) by controlling the position (e.g., the inflation position) of the one or more device bodies 122, 122A, 122B. In particular, the flow control device 120 may be operated to control an inflation position of the inflatable boot 130 for the one or more device bodies 122, 122A, 122B. The engine control system 24 may operate the flow control device 120 based on the determined air flow condition of the air intake 36 (see Step 902). The engine control system 24 may control the fluid regulator 132 to direct the pressurized fluid 136 to the inflatable boot 130 to inflate the inflatable boot 130 to an inflation position (e.g., a predetermined inflation position), thereby increasing a size of the inflatable boot 130. For example, the engine control system 24 may control the fluid regulator 132 to increase a fluid pressure of the inflatable boot 130 (e.g., as measured by the pressure sensor 138) to a predetermined pressure value, which predetermined pressure value may correspond to a selected inflation position for the inflatable boot 130. The engine control system 24 may control the fluid regulator 132 to direct the pressurized fluid 136 out of the inflatable boot 130 to deflate the inflatable boot 130, thereby decreasing a size of the inflatable boot 130. The inflatable boot 130 may be variably positionable (e.g., as controlled by the engine control system 24) in a fully inflated position, a fully deflated position, and a plurality of intermediate inflation positions.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A propulsion system for an aircraft, the propulsion system comprising:
    a gas turbine engine including a propeller, the propeller configured for rotation about a rotational axis of the propulsion system, the gas turbine engine forming a core flow path;
    an air intake configured to direct air into the core flow path, the air intake including an air inlet duct and a flow control device, the air inlet duct including an intake inlet disposed downstream of the propeller, the intake inlet including a top side, a bottom side, a first lateral side, and a second lateral side, each of the first lateral side and the second lateral side extending between and to the top side and the bottom side, the flow control device disposed inside the air inlet duct at the first lateral side, the flow control device configured to form an asymmetrical shape of the intake inlet at the first lateral side relative to the second lateral side, and the flow control device includes:
        an inflatable boot and a fluid regulator, the inflatable boot disposed at the first lateral side, the fluid regulator in fluid communication with the inflatable boot, the fluid regulator configured to selectively position the inflatable boot in a fully inflated position, a fully deflated position, and a plurality of intermediate inflation positions between the fully inflated position and the fully deflated position to control a shape of the intake inlet; and
    an engine control system, the engine control system in signal communication with the fluid regulator, the engine control system including a processor in communication with a non-transitory memory storing instructions, which instructions when executed by the processor, cause the processor to:
        determine an air flow condition for the air intake based on a rotation speed of the propeller and a rotation direction of the propeller; and
        control the fluid regulator to selectively position the inflatable boot to control the shape of the intake inlet based on the determined air flow condition.

2. The propulsion system of claim 1, wherein the gas turbine engine includes a compressor forming the core flow path, the fluid regulator in fluid communication with the compressor, the fluid regulator configured to receive a pressurized fluid from the compressor and direct the pressurized fluid to the inflatable boot.

3. The propulsion system of claim 1, wherein the intake inlet is radially offset from the rotational axis in a radial direction.

4. A propulsion system for an aircraft, the propulsion system comprising:
    a gas turbine engine including a propeller, the propeller configured for rotation about a rotational axis of the propulsion system, the gas turbine engine forming a core flow path;
    an air intake configured to direct air into the core flow path, the air intake including an air inlet duct and a flow control device, the air inlet duct including an intake inlet disposed downstream of the propeller, the intake inlet including a top side, a bottom side, a first lateral side, and a second lateral side, each of the first lateral side and the second lateral side extending between and to the top side and the bottom side, the flow control device disposed inside the air inlet duct at the first lateral side, the flow control device configured to form an asymmetrical shape of the intake inlet at the first lateral side relative to the second lateral side; and
    an engine control system, the engine control system in signal communication with the flow control device, the engine control system including a processor in communication with a non-transitory memory storing instructions, which instructions when executed by the processor, cause the processor to:
        determine an air flow condition for the air intake based on a rotation speed of the propeller and a rotation direction of the propeller; and
        control the flow control device to control the shape of the intake inlet based on the determined air flow condition.

5. The propulsion system of claim 4, wherein the intake inlet is radially offset from the rotational axis in a radial direction.

6. The propulsion system of claim 4, wherein the flow control device includes a first device body mounted to the interior surface at the first lateral side, the first device body having a deformable shape.

7. The propulsion system of claim 6, wherein the first device body includes a leading edge, a trailing edge, and an air flow surface, the leading edge disposed at the second lateral side, the trailing edge disposed downstream of the leading edge, the air flow surface extending from the leading edge to the trailing edge.

* * * * *